(12) United States Patent
Wiley

(10) Patent No.: US 9,975,258 B2
(45) Date of Patent: May 22, 2018

(54) AIR FLOW COOLING SYSTEM AND SELF BALANCING ROBOT INCORPORATING THE SAME

(71) Applicant: Facebook, Inc., Menlo Park, CA (US)

(72) Inventor: Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 220 days.

(21) Appl. No.: 14/795,554

(22) Filed: Jul. 9, 2015

(65) Prior Publication Data

US 2017/0008176 A1    Jan. 12, 2017

(51) Int. Cl.
*B25J 19/00* (2006.01)
*B25J 5/00* (2006.01)

(52) U.S. Cl.
CPC ........... *B25J 19/0054* (2013.01); *B25J 5/007* (2013.01); *Y10S 901/01* (2013.01)

(58) Field of Classification Search
CPC combination set(s) only.
See application file for complete search history.

(56) References Cited

U.S. PATENT DOCUMENTS

| | | |
|---|---|---|
| 1,887,355 A | 11/1932 | Kranick et al. |
| 2,535,842 A | 12/1950 | Criley et al. |
| 2,659,220 A | 11/1953 | Cherry et al. |
| 2,913,082 A | 11/1959 | Becknell et al. |
| 3,780,538 A | 12/1973 | Mann et al. |
| 4,932,491 A | 6/1990 | Collins et al. |
| 5,158,493 A | 10/1992 | Morgrey |
| 5,318,202 A * | 6/1994 | D'Andrade ........... B05B 9/0426 222/401 |
| 5,551,917 A | 9/1996 | Wood |
| 6,311,794 B1 | 11/2001 | Morrell et al. |
| 6,568,519 B2 | 5/2003 | Lovatt et al. |
| 7,494,398 B2 | 2/2009 | Laurienzo |
| D626,578 S * | 11/2010 | Wiley .......................... D15/199 |
| D627,377 S * | 11/2010 | Wiley .......................... D15/199 |
| 8,041,456 B1 * | 10/2011 | Blackwell .............. B25J 9/1674 318/568.12 |
| 8,083,013 B2 | 12/2011 | Bewley et al. |
| 8,160,747 B1 * | 4/2012 | Blackwell ................ B25J 9/162 700/245 |
| 8,306,664 B1 * | 11/2012 | Wiley ...................... B25J 5/007 280/304 |

(Continued)

OTHER PUBLICATIONS

Corrected Notice of Allowability dated Jun. 15, 2017 of U.S. Appl. No. 14/795,589 by Wiley, S. et al., filed Jul. 9, 2015.

(Continued)

*Primary Examiner* — Thomas G Black
*Assistant Examiner* — Ana D Thomas
(74) *Attorney, Agent, or Firm* — FisherBroyles, LLP

(57) ABSTRACT

Technology is provided for an air flow cooling system and self-balancing robot incorporating the same. The robot includes a body, a robot controller disposed in the body, and a pair of axle housings extending from the body, each containing a drive assembly. An arm extends from the body and supports a head unit. A plurality of intake fans are disposed in the body and are configured to draw air into the body, thereby pressurizing the body, axle housings, and head unit. An axle fan is disposed in at least one of the pair of axle housings and is configured to exhaust air from the axle housings.

17 Claims, 17 Drawing Sheets

(56) References Cited

U.S. PATENT DOCUMENTS

| | | | |
|---|---|---|---|
| 8,442,661 B1* | 5/2013 | Blackwell | B25J 9/1689 700/245 |
| 8,788,096 B1* | 7/2014 | Sokol | B25J 5/007 280/298 |
| 9,290,905 B1 | 3/2016 | Strackbein et al. | |
| 9,759,267 B2* | 9/2017 | Wiley | F16D 7/027 |
| 2005/0102790 A1* | 5/2005 | Matsuno | A47L 9/0081 15/326 |
| 2006/0190133 A1* | 8/2006 | Konandreas | A22C 17/0013 700/245 |
| 2006/0190146 A1* | 8/2006 | Morse | A47L 5/14 701/23 |
| 2006/0243499 A1 | 11/2006 | Hosoda et al. | |
| 2007/0016328 A1* | 1/2007 | Ziegler | A47L 5/14 700/245 |
| 2007/0035143 A1* | 2/2007 | Blackwell | B25J 9/104 294/111 |
| 2007/0137905 A1 | 6/2007 | Lee et al. | |
| 2008/0105481 A1 | 5/2008 | Hutcheson et al. | |
| 2011/0313568 A1* | 12/2011 | Blackwell | B25J 5/007 700/245 |
| 2012/0215355 A1 | 8/2012 | Bewley et al. | |
| 2013/0145572 A1* | 6/2013 | Schregardus | A47L 11/4036 15/319 |
| 2013/0231779 A1* | 9/2013 | Purkayastha | B25J 9/1697 700/259 |
| 2014/0133088 A1* | 5/2014 | Wiley | G06F 1/20 361/679.46 |
| 2014/0133089 A1* | 5/2014 | Wiley | H05K 7/20745 361/679.46 |
| 2014/0177163 A1* | 6/2014 | Wiley | H05K 7/20745 361/679.46 |
| 2015/0041440 A1* | 2/2015 | Mate | B23K 9/324 219/73.2 |
| 2015/0308466 A1* | 10/2015 | Girtman | B25J 15/0052 92/163 |
| 2016/0272291 A1* | 9/2016 | Outa | B60F 3/0015 |
| 2017/0008579 A1* | 1/2017 | Wiley | B62D 61/06 |
| 2017/0009816 A1 | 1/2017 | Wiley et al. | |
| 2017/0174112 A1* | 6/2017 | Sadinski | B60P 1/28 |
| 2017/0275906 A1* | 9/2017 | Erlich | E04H 4/1654 |
| 2017/0280960 A1* | 10/2017 | Ziegler | A47L 11/302 |

OTHER PUBLICATIONS

Non-Final Office Action dated Oct. 27, 2016 for U.S. Appl. No. 14/795,589 by Wiley S, filed Jul. 9, 2015.

Notice of Allowance dated Oct. 23, 2017 for U.S. Appl. No. 14/795,615 by Wiley, S., et al., filed Jul. 9, 2015.

Ganapati, P., "Anybots Robot Will go to the Office for You," [online], Wired, May 18, 2010. [Retrieved on Aug. 20, 2015], Retrieved from the Internet: http://www.wired.com/2010/05/anybots-robot-telepresence/#1, pp. 1-17.

U.S. Appl. No. 14/795,589 by Wiley, S.C., et al., filed Jul. 9, 2015.

U.S. Appl. No. 14/795,615 by Wiley, S.C., et al., filed Jul. 9, 2015.

Non-Final Office Action dated Mar. 22, 2017, for U.S. Appl. No. 14/795,615 of Wiley, S. et al., filed Jul. 9, 2015.

Notice of Allowance dated May 5, 2017 of U.S. Appl. No. 14/795,589 by Wiley, S. et al., filed Jul. 9, 2015.

\* cited by examiner

AIR FLOW COOLING SYSTEM AND SELF BALANCING ROBOT INCORPORATING THE SAME

TECHNICAL FIELD

This patent application is directed to self-balancing robots and, more specifically, to an air flow cooling system and self-balancing robot incorporating the same.

BACKGROUND

Conventional mobile robots are typically supported on two, three, four or more wheels. The two-wheeled, self-balancing robots have the advantage that they can be tall with a relatively small footprint; however, they can have limitations with respect to load carrying capacity. On the other hand, the three- and four-wheeled robots are more stable and can have higher load carrying capacity, but less height. Accordingly, there is a need for a robot that has both the height of a self-balancing, two-wheeled robot and the load carrying capacity of a three- or four-wheeled robot.

BRIEF DESCRIPTION OF THE DRAWINGS

Embodiments of the self-balancing robot introduced herein may be better understood by referring to the following Detailed Description in conjunction with the accompanying drawings, in which like reference numerals indicate identical or functionally similar elements.

Figure 1:
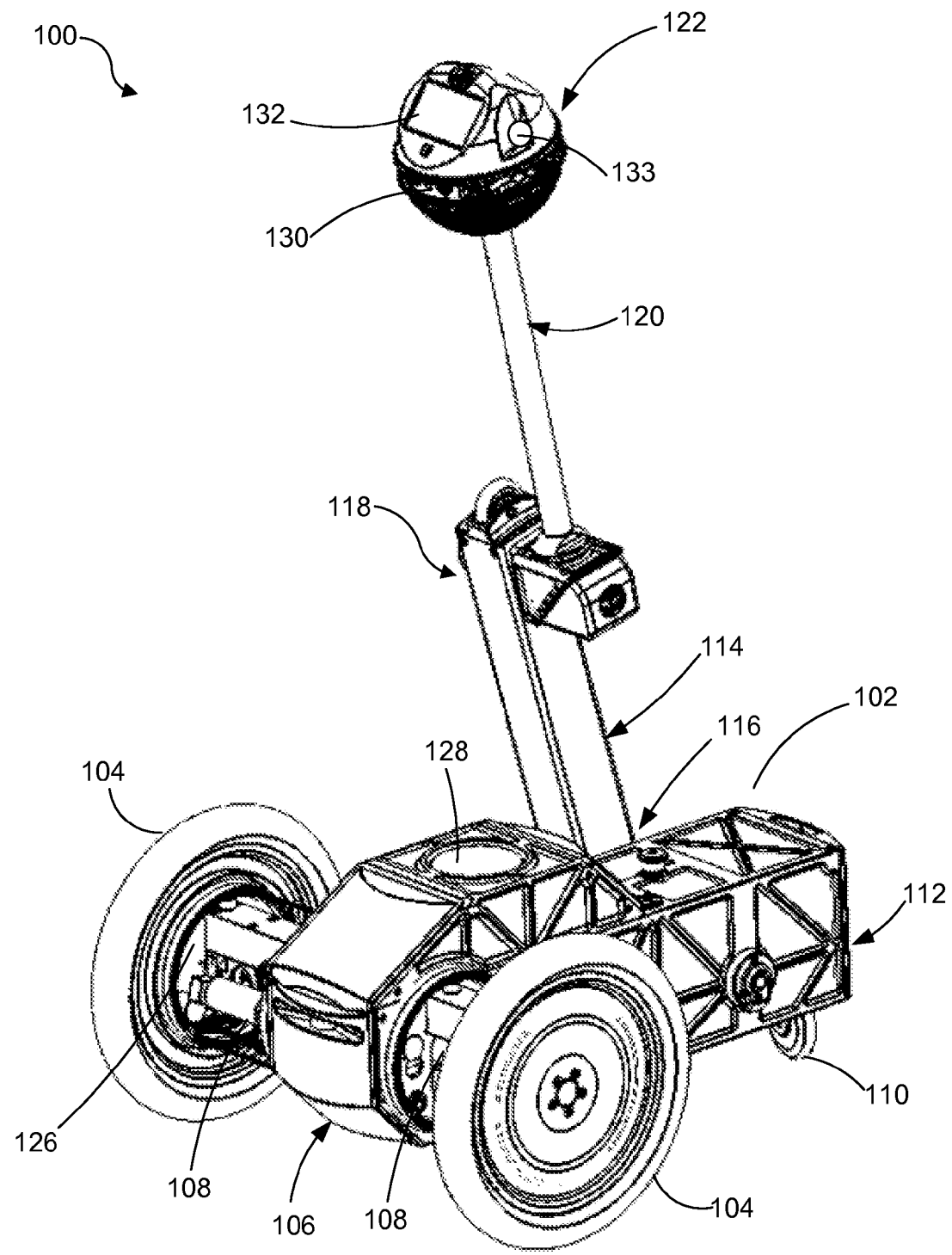
FIG. 1 is an isometric view of a self-balancing robot according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A self-balancing robot that transitions between a three-wheeled mode and a two-wheeled self-balancing mode is disclosed. The robot includes a body and a pair of drive wheels located at a first end portion of the body. Each drive wheel is coupled to a drive assembly operative to propel the robot along a surface. A third support wheel is located on the body at a second end portion opposite the first end portion. A main arm is coupled to the body, wherein the main arm is rotatable to confront the surface and to rotate the body relative to the drive wheels between a lowered position and a raised position, thereby lifting the third wheel away from the surface, and standing the body up onto the pair of drive wheels in preparation for self-balancing.

In some embodiments, the robot includes a torque limiting clutch for use with the main arm. In the event that the robot encounters another object, it is desirable that the arm only resist movement up to a certain torque limit against the motors. Such torque limiting can help prevent damage to the robot. The torque limiting clutch includes a hub including a hub flange with a clamp plate slideably mounted on the hub. A drive member is rotatably mounted on the hub between the hub flange and the clamp plate. The drive member includes a plurality of gear teeth disposed around an annular clutch disc. A first friction disc is positioned between the hub flange and the annular clutch disc, and a second friction disc is positioned between the clamp plate and the annular clutch disc. A plurality of clamp fasteners extend through the hub flange and engage the clamp plate to exert a clamping force operative to urge the clamp plate toward the hub flange, thereby pressing the friction discs against the annular clutch disc in order to transfer torque between the gear teeth and the hub.

In some embodiments, the robot includes an air flow cooling system. The robot includes a head unit coupled to the main arm, which is connected to the body, and a robot controller is in the body. A pair of axle housings extend from the body, wherein each axle housing contains a drive assembly coupled to the robot controller. A plurality of intake fans are disposed in the body and are configured to draw air into the body, thereby pressurizing the body, axle housings, and head unit. An axle fan is disposed in at least one of the pair of axle housings and is configured to exhaust air from the axle housings.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

As shown in FIG. 1, an embodiment provides a robot 100 with a body 102 and a pair of drive wheels 104 located at a first end portion 106 of the body 102. Each drive wheel 104 is coupled to a drive assembly 108 operative to rotate the drive wheels, thereby propelling the robot 100 along the ground, floor, or other support surface. Although the embodiments are described with respect to drive wheels, alternative ground-engaging drivers can be used. For example, in some embodiments, endless tread, such as tracks could be used in lieu of the drive wheels 104. Each drive assembly 108 is positioned within an axle housing 126 that extends from the body 102. A support member in the form of a third wheel 110 is located on the body 102 at a second end portion 112 opposite the first end portion 106. In some embodiments, the third wheel is a caster wheel. The robot 100 has a main arm 114 with a proximal end portion 116 rotatably coupled to the body 102 adjacent to the second end portion. A distal end portion 118 of main arm 114 is rotatably coupled to a forearm 120 that supports a head unit 122. In the illustrated embodiment, the head unit 122 can include a display screen 132, a camera 130, and microphones 133. The robot 100 also includes a speaker 128. The camera 130 and microphones 133 receive input in the form of video and sound. The display screen 132 and speaker 128 provide visual and audible output to a user interacting with robot 100. In some embodiments, the body 102 can be configured with a storage region or a cargo support to carry items when the robot is in a three-wheeled mode.

Figure 2:
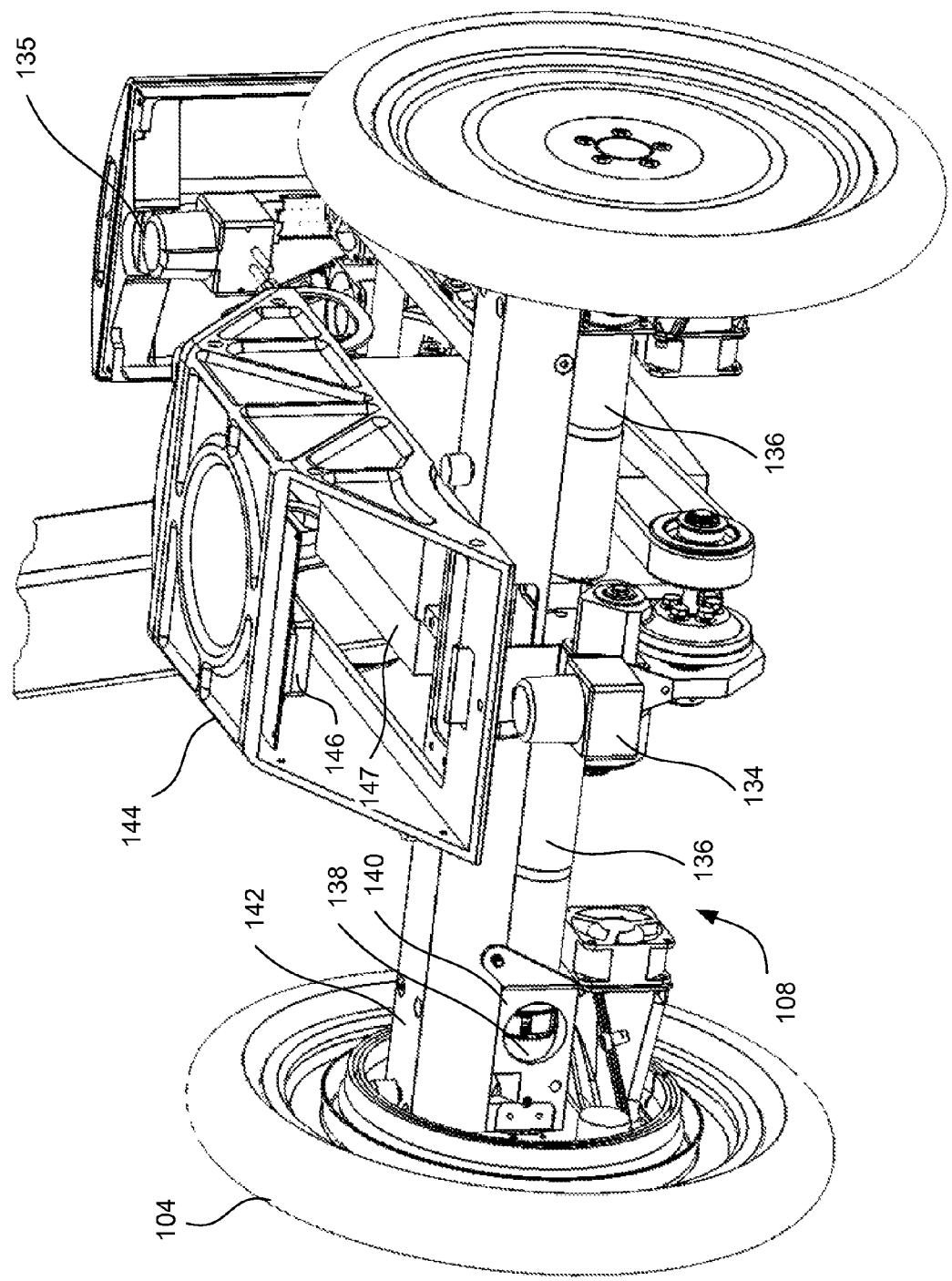
FIG. 2 is a partial isometric view of the robot shown in FIG. 1 with various components hidden to show the robot drive assemblies.

As shown in FIG. 2, each drive assembly 108 includes a drive motor 136 coupled to a corresponding drive wheel 104 by a flexible coupling 138. The flexible coupling 138 and drive motor 136 are supported in a bearing block 140. Bearing block 140 is attached to a cross member 142 extending transversely from body 102 (see FIG. 1). A robot controller 146 is disposed in speaker housing 144 and is operative to control the drive assemblies 108 such that the body 102 can self-balance on the pair of drive wheels 104. The controller 146 balances the robot using a conventional dynamic stabilization system with a gyroscope based sensor system. A battery 147 or other suitable power source is located in the body 102 to power the robot controller, sensors, drive motors, and/or other components. Robot 100 also includes forward and aft light detection and ranging (LIDAR) sensors 134 and 135, respectively. The robot controller 146 receives input from the LIDAR sensors in order to navigate the robot.

Figure 3:
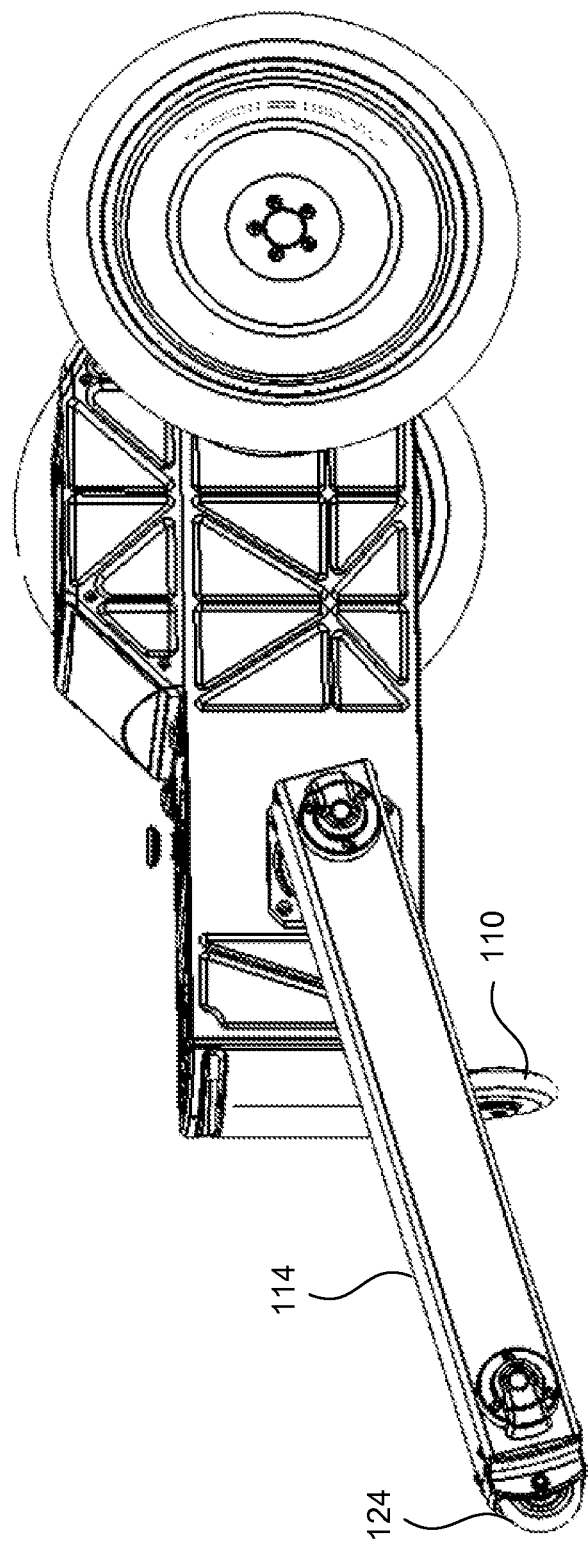
FIG. 3 is an isometric view of the robot shown in FIGS. 1 and 2 as viewed from the side illustrating a main robot arm in a lowered position.
Figure 4:
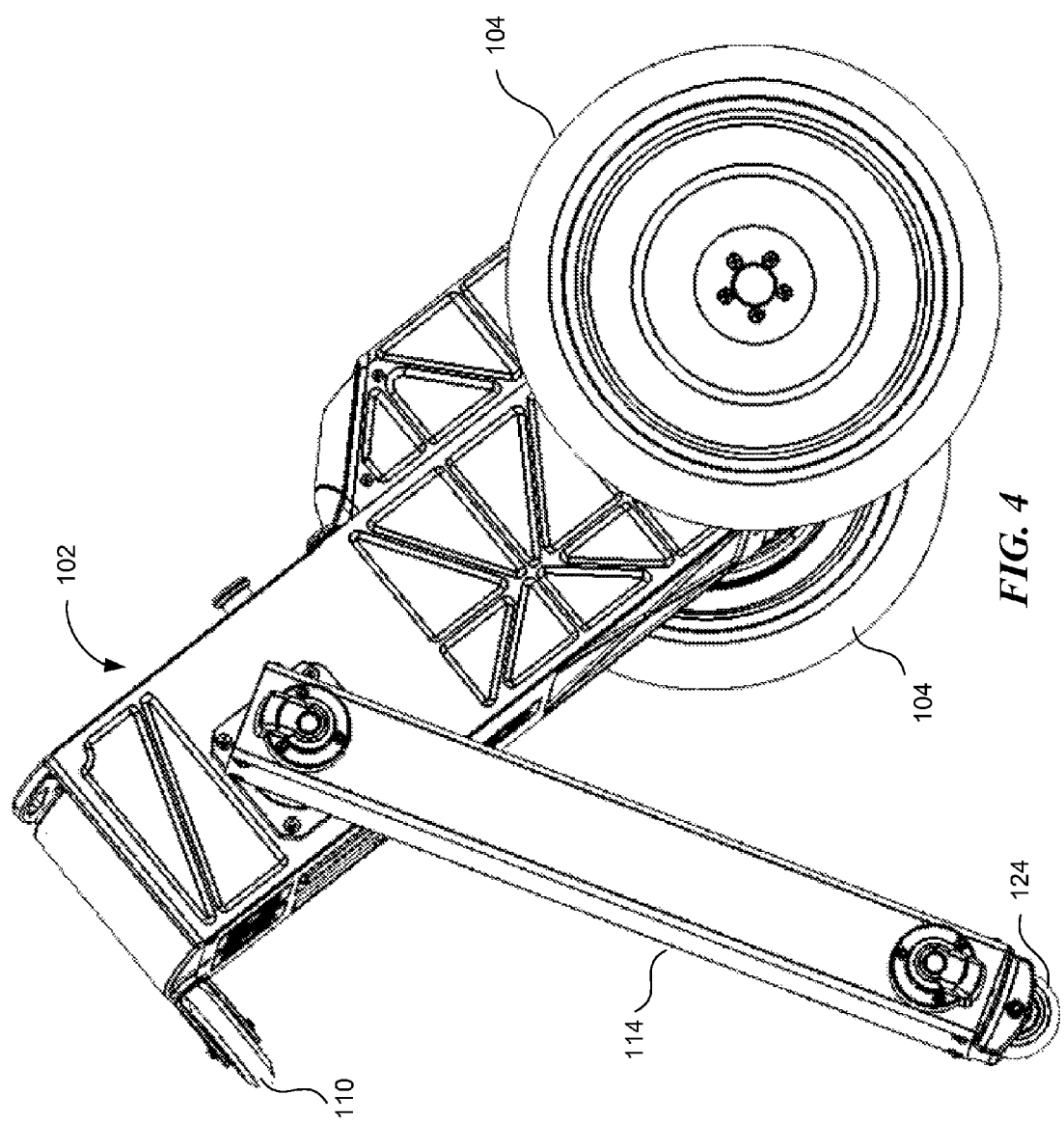
FIG. 4 is an isometric view of the robot shown in FIGS. 1-3 illustrating the main robot arm in a lifted position.

As illustrated in FIGS. 3 and 4, the main arm 114 is coupled to the body 102 such that when the main arm 114 is rotated to confront a surface, the caster wheel 110 is lifted away from the surface, thereby standing the body 102 up onto the pair of drive wheels 104 (the forearm 120 and head unit 122 are hidden in FIGS. 3 and 4 so as not to obscure the function of main arm 114). As the main arm 114 is rotated to confront the surface, the forearm 120 is rotated to maintain the head unit 122 in position above the body 102. In some embodiments, main arm 114 includes an idler wheel 124 to confront the surface. The main arm 114 lifts the body 102 from a lowered position (FIG. 3) up onto the pair of drive wheels 104 to a raised position (FIG. 4) in order to facilitate the transition from a three-wheeled mode to a two-wheeled self-balancing mode. Conversely, the main arm 114 is operative to lower the body 102 from the raised position to the lowered position when the robot transitions from the two-wheeled self-balancing mode to the three-wheeled mode. Once the body 102 is in the raised position a conventional dynamic stabilization system activates to balance the robot on the pair of drive wheels 104. Once the robot is balanced on the drive wheels the main arm 114 and the forearm 120 rotate back to a vertically extended configuration so that the head unit 122 is at its tallest position.

Figure 5:
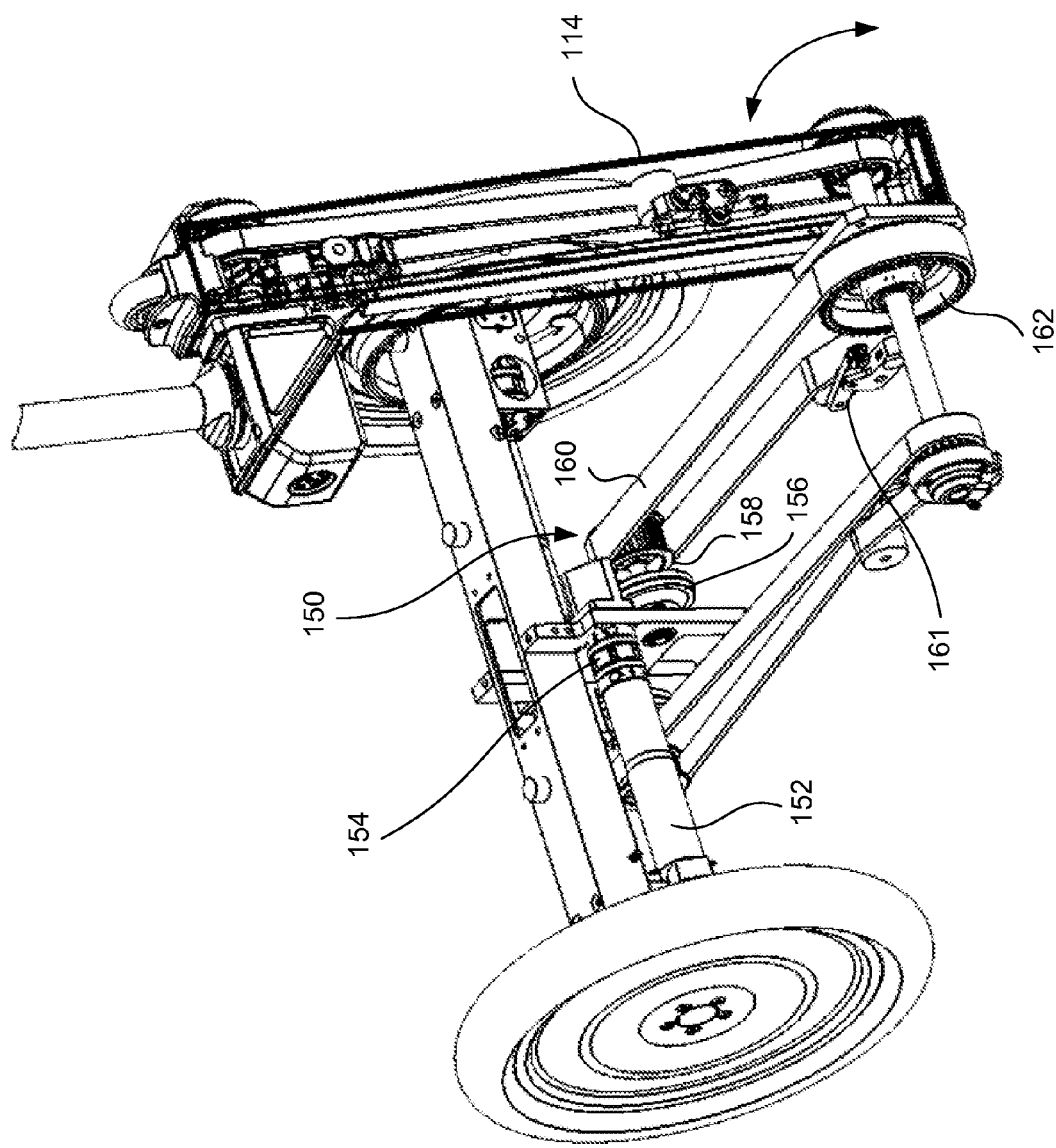
FIG. 5 is a partial isometric view of the robot as viewed from the rear with various components hidden to show the arm drive mechanism.

As shown in FIG. 5, the main arm 114 includes an arm drive mechanism 150 operative to rotate the main arm 114 relative to the body 102. The arm drive mechanism 150 includes an arm drive motor 152 coupled to a torque limiting clutch 156 via flexible coupling 154. The torque limiting clutch 156 transfers torque from the arm drive motor 152 to rotate an arm drive pulley 158 and corresponding arm drive belt 160. In some embodiments, arm drive pulley 158 is a timing sprocket, and arm drive belt 160 is a timing belt. The arm drive belt 160 rotates an arm pulley 162 attached to the arm 114. As the arm pulley 162 is rotated back and forth, the main arm 114 rotates back and forth. In some embodiments, the arm drive mechanism 150 can include a belt tensioner assembly 161.

Figure 6:
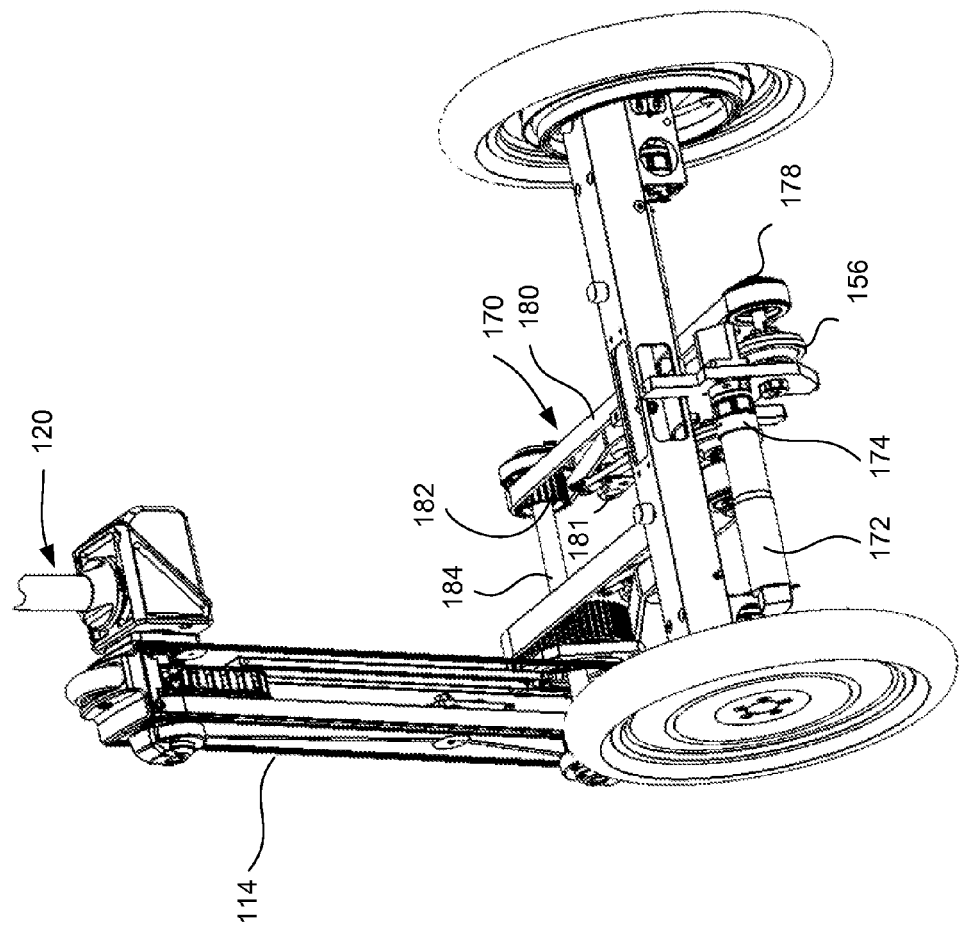
FIG. 6 is a partial isometric view of the robot as viewed from the front with various components hidden to show a forearm drive mechanism.

With reference to FIG. 6, the forearm 120 rotates with respect to the main arm 114. The forearm 120 moves relative to main arm 114 by a forearm drive mechanism 170 disposed in the body 102 (see FIG. 1). The forearm drive mechanism 170 includes a forearm motor 172 coupled to a torque limiting clutch 156 via flexible coupling 174. The torque limiting clutch 156 transfers torque from forearm motor 172 to rotate a forearm drive pulley 178 and corresponding forearm drive belt 180. The forearm drive belt 180 rotates forearm pulley 182 which is in turn connected to forearm shaft 184. In some embodiments, the forearm drive mechanism 170 includes a belt tensioner assembly 181.

Figure 7:
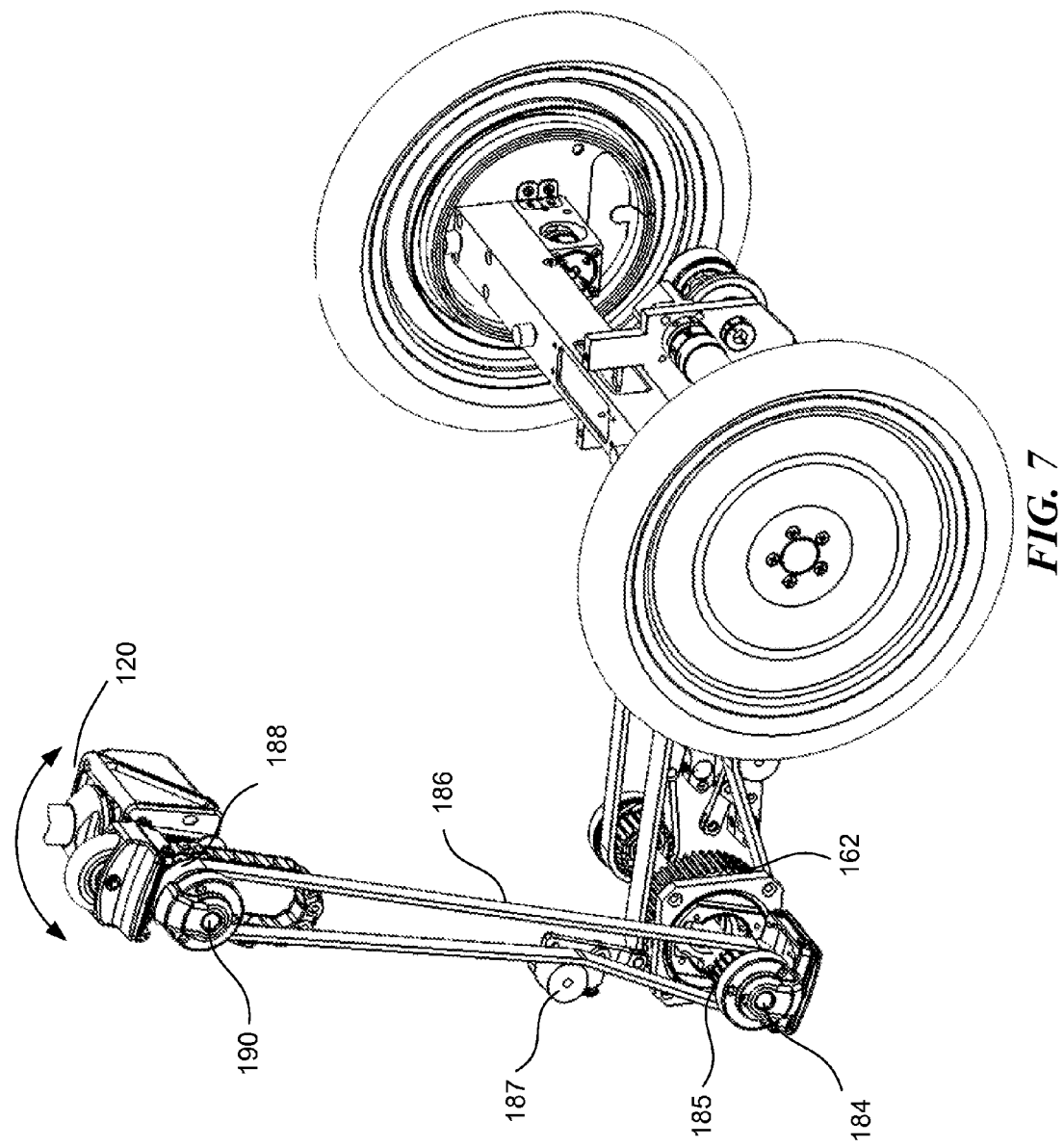
FIG. 7 is an isometric view of the robot as viewed from the side with various components hidden to show the forearm drive mechanism.

With further reference to FIG. 7, the forearm shaft 184 extends through the arm pulley 162 and connects to a second forearm drive pulley 185 located within main arm 114 (see FIG. 6). The second forearm drive pulley 185 drives second forearm drive belt 186 which rotates second forearm pulley 188 and second forearm shaft 190. The forearm 120 is mounted on second forearm shaft 190. Accordingly, as the second forearm shaft 190 rotates, the forearm 120 rotates. In some embodiments, the forearm drive mechanism 170 (see FIG. 6) includes a second belt tensioner assembly 187 to tension the second forearm drive belt 186.

Figure 8:
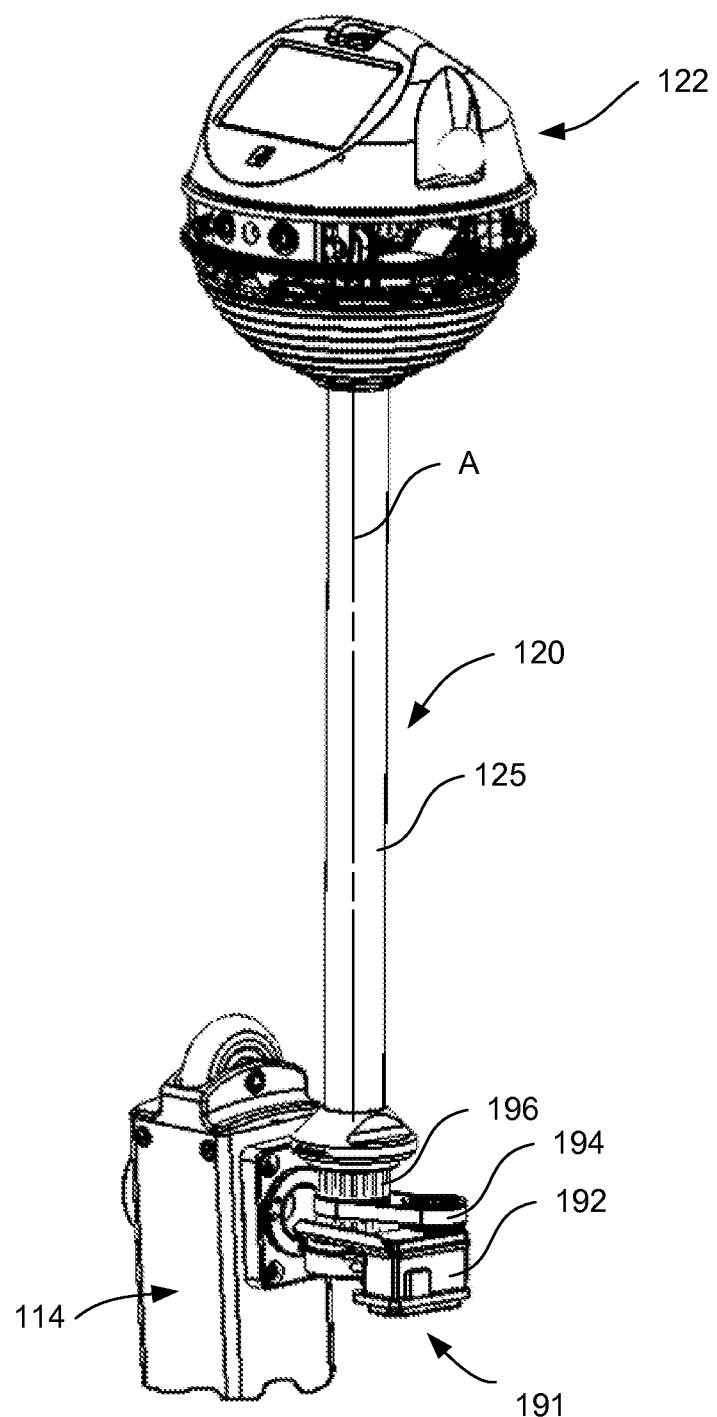
FIG. 8 is a partial isometric view of the forearm attached to the main arm, and a head unit of the robot attached to the forearm.

As shown in FIG. 8, the forearm 120 extends along a longitudinal axis A and supports head unit 122. The forearm 120 includes a head unit drive mechanism 191 connected to the forearm shaft 125 and is operative to rotate the forearm shaft 125 and the head unit 122 about the longitudinal axis A. The head unit drive mechanism 191 includes a servo 192 that drives pulley 196 attached to the forearm shaft 125 via servo belt 194. In some embodiments, the forearm shaft 125 can be telescoping to provide additional height range.

Figure 9:
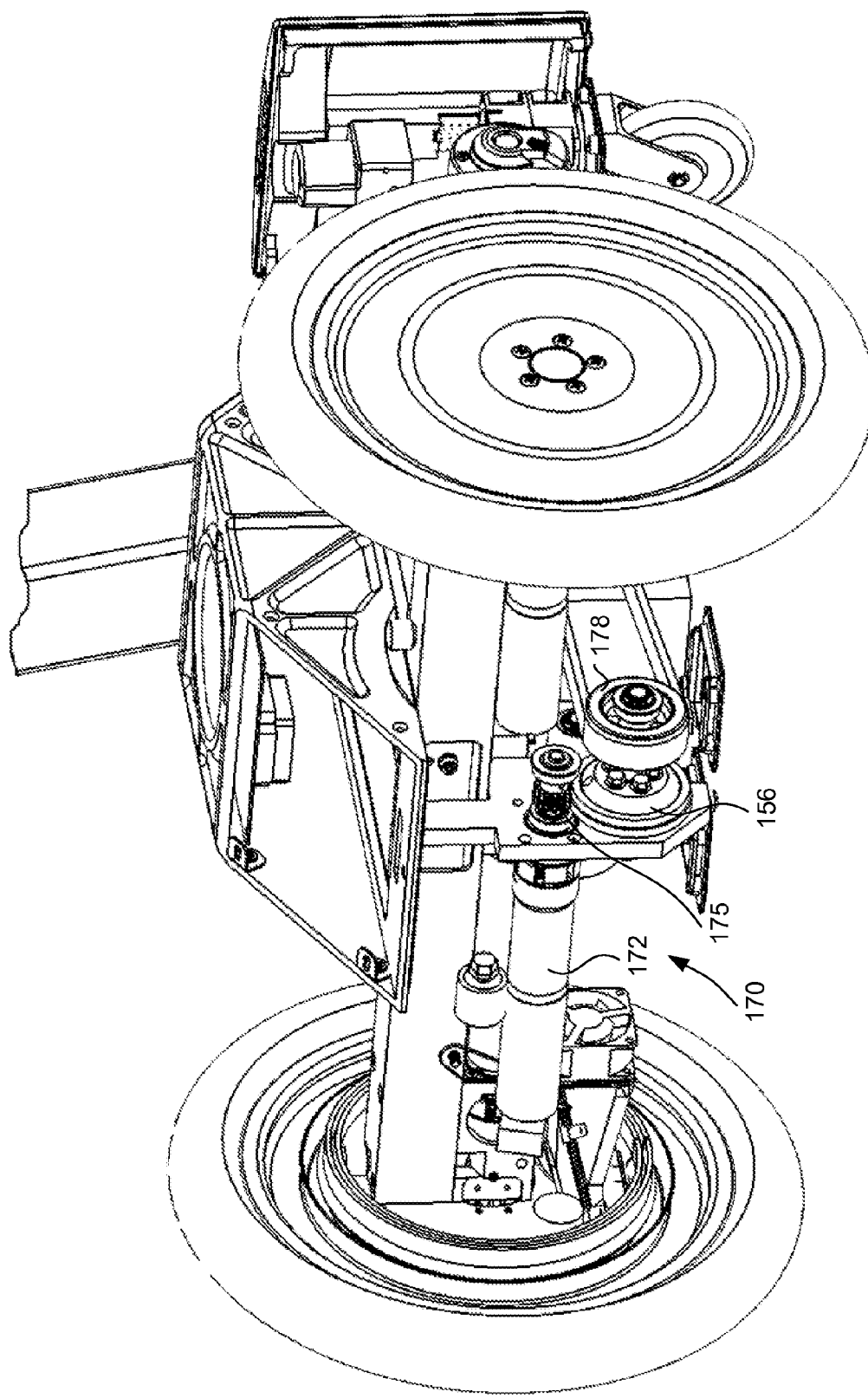
FIG. 9 is an enlarged partial isometric view of the robot as viewed from the front with various components hidden to show a torque limiting clutch.

As disclosed above, the arm drive mechanism 150 and the forearm drive mechanism 170 each include a torque limiting clutch 156 to limit the amount of torque transmitted to the main arm and forearm. In the event that the robot encounters a solid object, it is desirable that the main arm and forearm only resist movement up to a certain torque limit against their corresponding motors. Such torque limiting can help prevents excess stress or damage to the robot during operation. As the arm drive mechanism and forearm drive mechanism are similar, the torque limiting clutch 156 is described with respect to the forearm drive mechanism 170, shown in FIG. 9, and the description of clutch 156 therefore equally applies to the arm drive mechanism 150. The forearm motor 172 is connected to the torque limiting clutch 156 through spur gear 175. The torque limiting clutch 156 in turn transmits a limited amount of torque to the forearm drive pulley 178.

Figure 10:
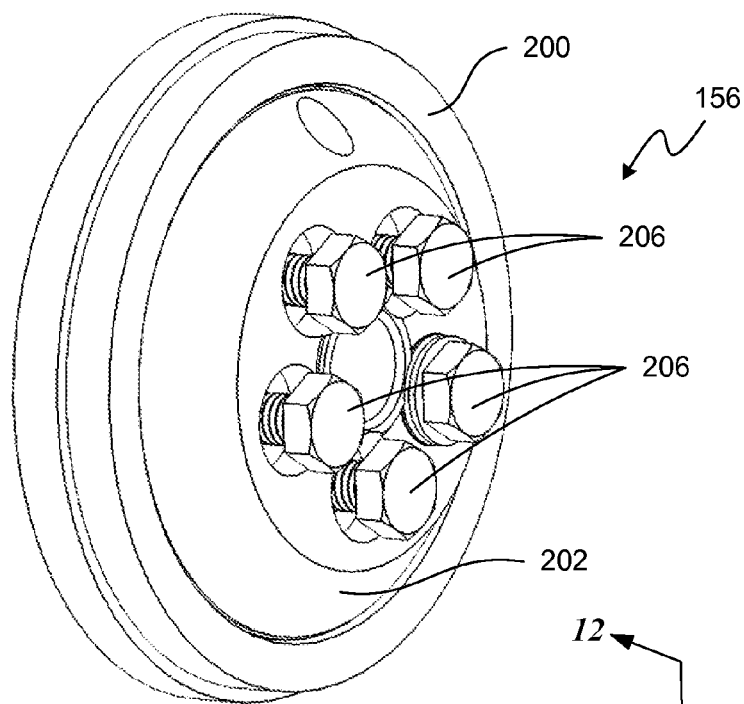
FIG. 10 is an isometric view of the torque limiting clutch according to a representative embodiment.
Figure 11:
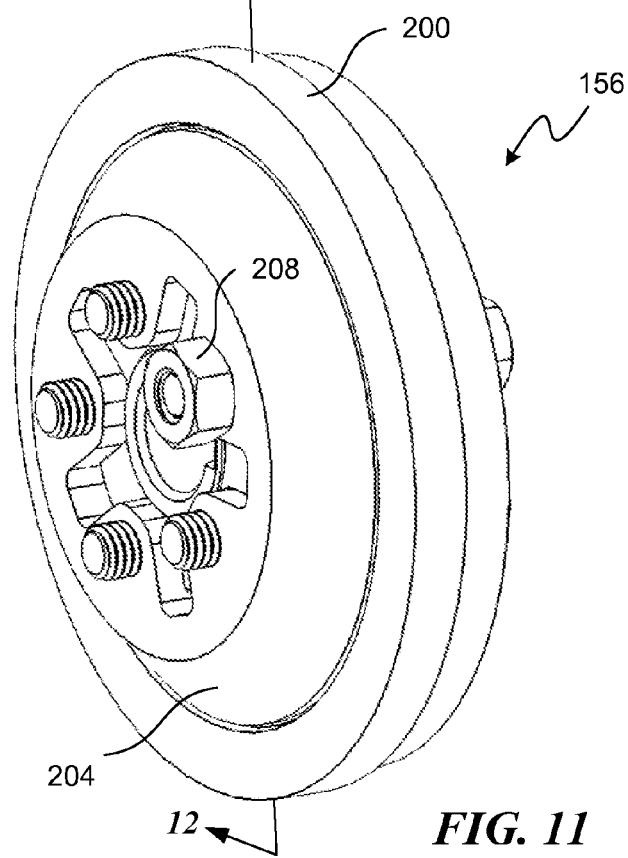
FIG. 11 is an isometric view of the torque limiting clutch shown in FIG. 10.

As shown in FIGS. 10 and 11, the torque limiting clutch 156 includes a drive member 200 disposed between a hub 202 and a clamp plate 204. The drive member 200, the hub 202, and the clamp plate 204 are clamped together by a plurality of clamping fasteners 206. In some embodiments, the clamping fasteners 206 are hex cap screws that thread into the clamp plate 204. In some embodiments, the clamping fasteners 206 are retained in position by a suitable nut 208.

Figure 12:
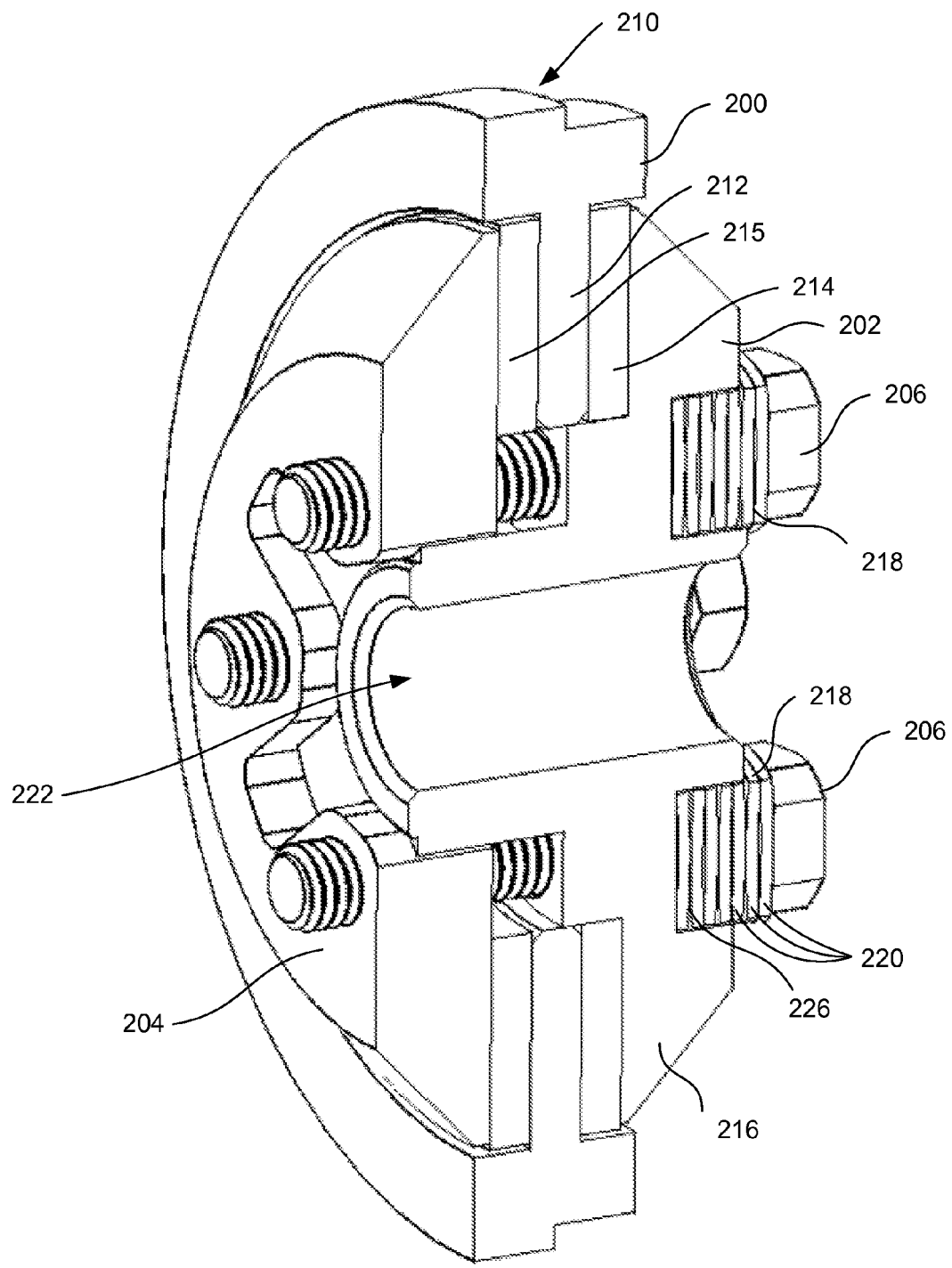
FIG. 12 is an isometric, cross-section view of the torque limiting clutch taken substantially along lines 12-12 of FIG. 11.
Figure 13:
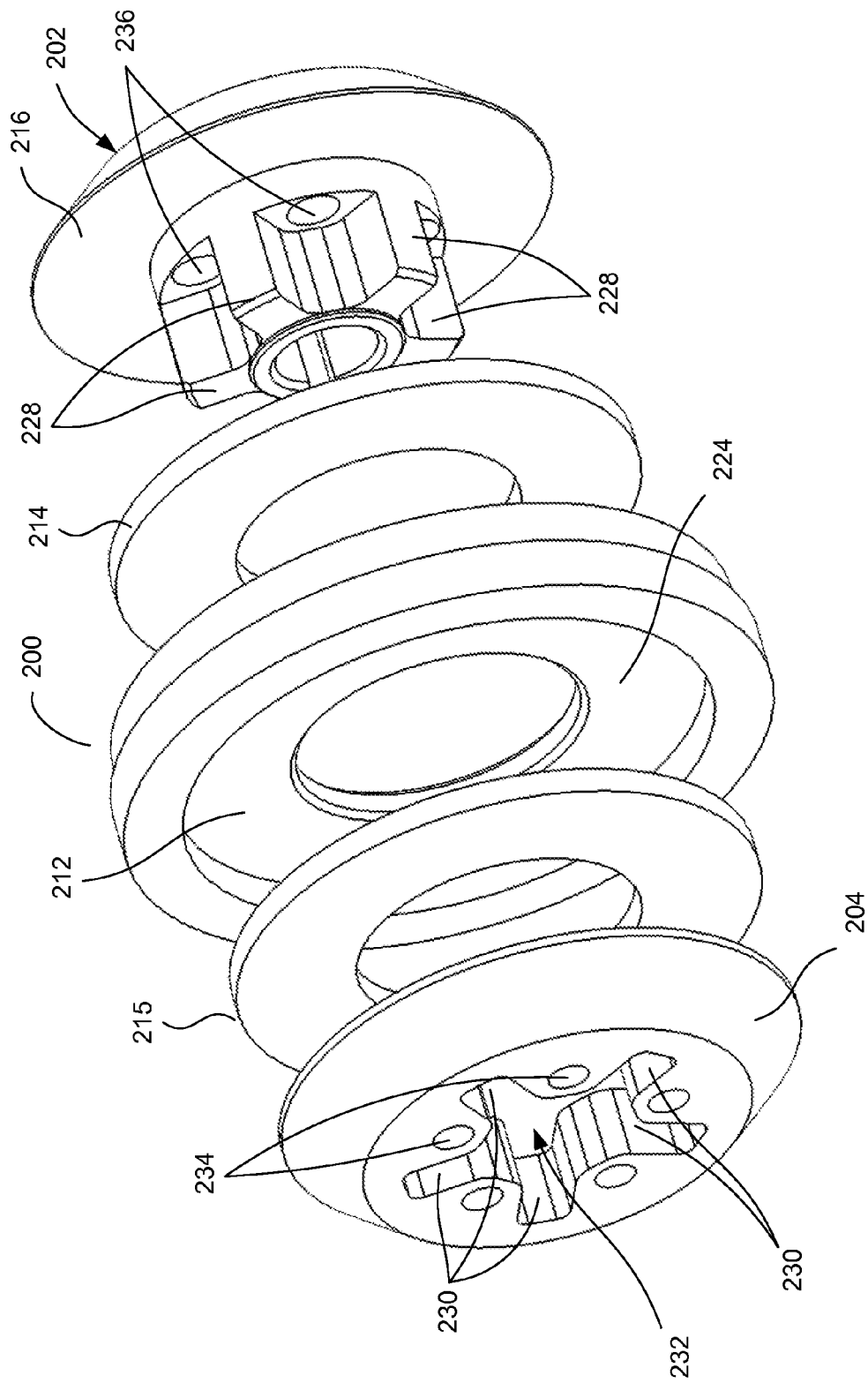
FIG. 13 is an exploded isometric view of the torque limiting clutch shown in FIGS. 10-12.

As shown in FIGS. 12 and 13, the hub 202 includes a hub flange 216. The clamp plate 204 is slideably mounted on the hub 202 opposite the hub flange 216. The drive member 200 is rotatably mounted on the hub 202 between the hub flange 216 and the clamp plate 204. The drive member 200 includes a plurality of gear teeth 210 (shown schematically) disposed around an annular clutch disc 212.

A first friction disc 214 is positioned between the hub flange 216 and the annular clutch disc 212. A second friction disc 215 is positioned between the clamp plate 204 and the annular clutch disc 212. A spring element 218 is positioned between the hub flange 216 and each clamp fastener 206. The spring elements 218 exert a clamping force operative to urge the clamp plate 204 toward the hub flange 216. Accordingly, the friction discs 214 and 215 are pressed against the annular clutch disc 212 in order to transfer torque between the gear teeth 210 and the hub 202. Hub 202 includes a bore 222 to receive a shaft (not shown). The hub flange 216 includes a plurality of pockets 226 corresponding to each clamping fastener 206 and configured to receive an associated spring element 218. In some embodiments, the spring elements 218 are comprised of a stack of Belleville washers 220.

With specific reference to FIG. 13, the annular clutch disc 212 includes recessed surfaces 224 on either side of the annular clutch disc 212 configured to receive the friction discs 214 and 215 therein. The hub 202 includes a plurality of splines 228, and the clamp plate 204 includes an aperture 232 configured with corresponding grooves 230 that slideably mate with the plurality of splines 228. Thus, the clamp plate 204 is prevented from rotating relative to the hub 202.

The hub flange 216 includes a plurality of through bores 236 sized to receive the clamping fasteners 206, and the clamp plate 204 includes a plurality of threaded bores 234 into which the clamping fasteners 206 are threaded. The amount of torque transmitted between the drive member 200 and the hub 202 is limited by the friction developed between the friction discs 214 and 215, the hub flange 216, the annular clutch disc 212, and the clamp plate 204 as they are clamped together by the clamping fasteners 206 and the spring elements 218 (see FIG. 12). Accordingly, the amount of torque transmitted between the drive member 200 and hub 202 can be adjusted by varying the torque of clamping fasteners 206.

Figure 14:
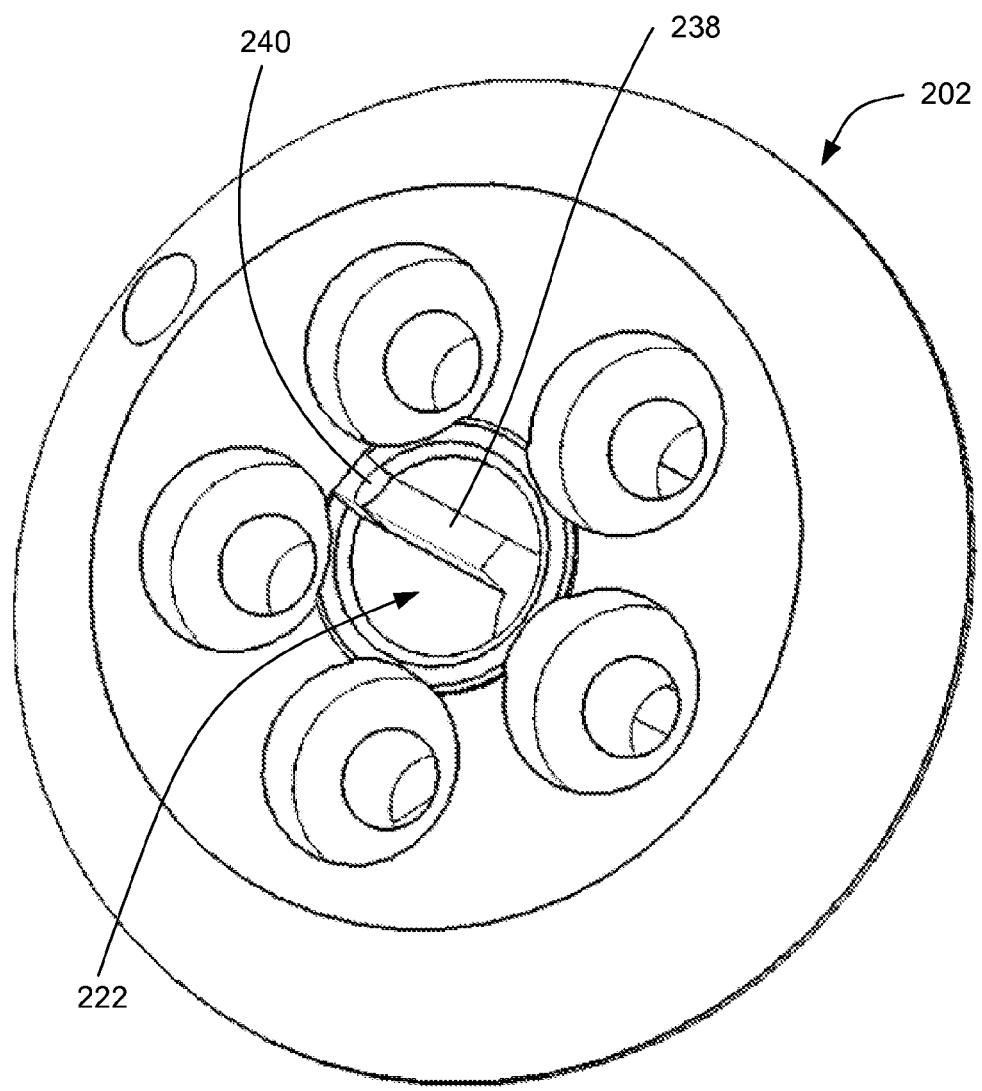
FIG. 14 is an isometric view of a hub of the torque limiting clutch of FIG. 10.

With reference to FIG. 14, the hub 202 includes a keyway 238 formed into axial bore 222 to receive a suitable key (not shown) in order to key an output shaft (not shown) to the hub 202. In addition, the keyway 238 may intersect a threaded bore 240 for receiving a set screw (not shown) to retain the key in the keyway 238.

Figure 15:
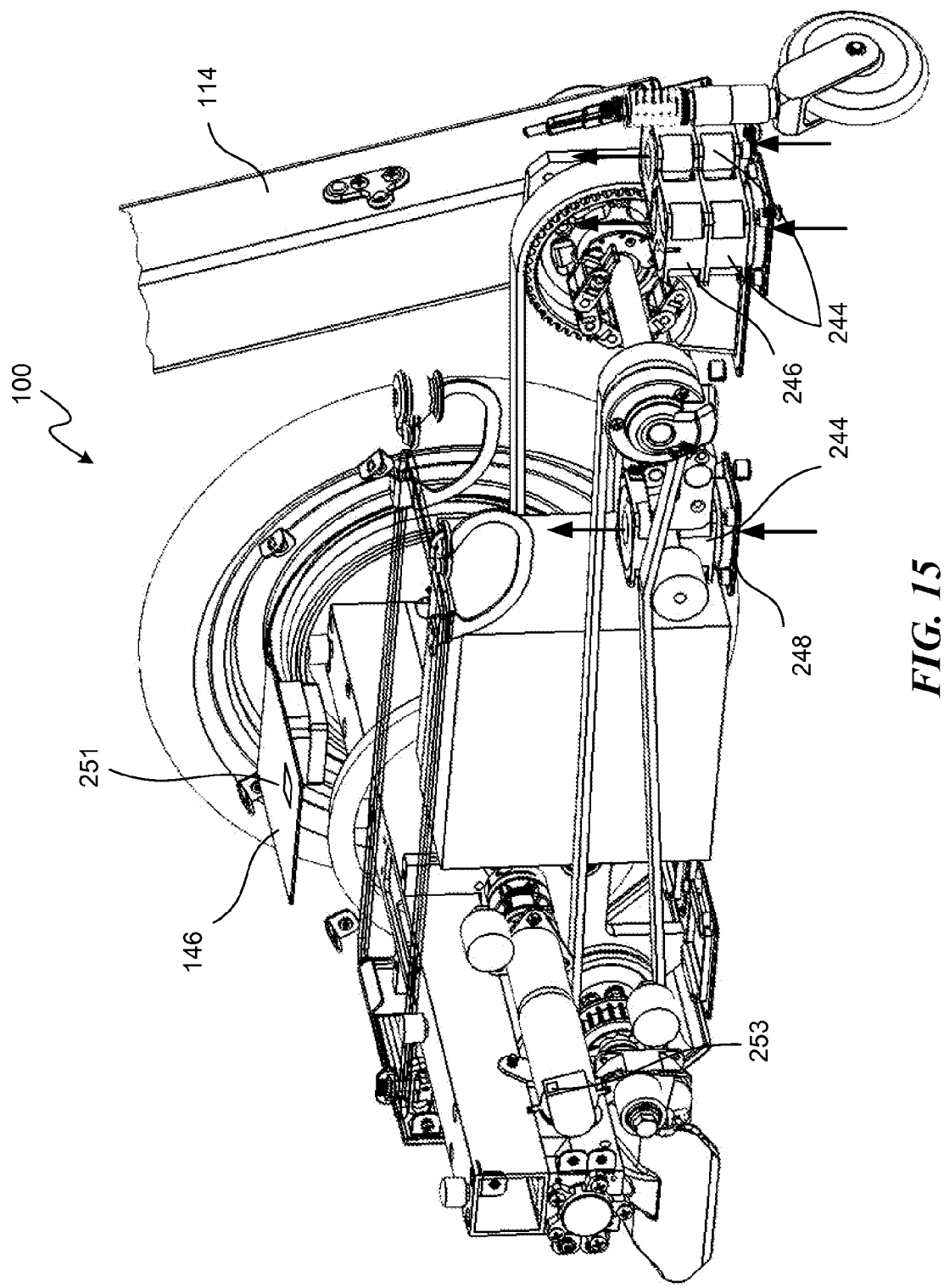
FIG. 15 is a partial isometric view of the robot of FIG. 1 with various components hidden to show the robot's air flow cooling system.

As shown in FIG. 15, the robot 100 includes an air flow cooling system operatively coupled to the robot controller 146. The air flow cooling system includes an arrangement of fan stacks 244, each comprising a pair of intake fans 246. The air flow cooling system provides air to the various motors, controllers, and components of the robot in order to cool the components. The air flow cooling system also includes intake vents 248 positioned on the underside of the body 102 (see FIG. 1), and the fan stacks 244 are in fluid communication with the intake vents 248. The intake fans 246 are configured to draw air into the body 102, thereby pressurizing the body 102, axle housings 126, and the head unit 122 (see FIG. 1).

In some embodiments, the air flow cooling system also includes temperature sensors disposed in the head unit, axle housings, and body in order to feed temperature information to the robot controller 146 which in turn varies the fan speeds in order to control the temperature therein. For example, the air flow cooling system can include a body temperature sensor 251, an axle housing temperature sensor 253, and a head unit temperature sensor 255 (see FIG. 16).

Figure 16:
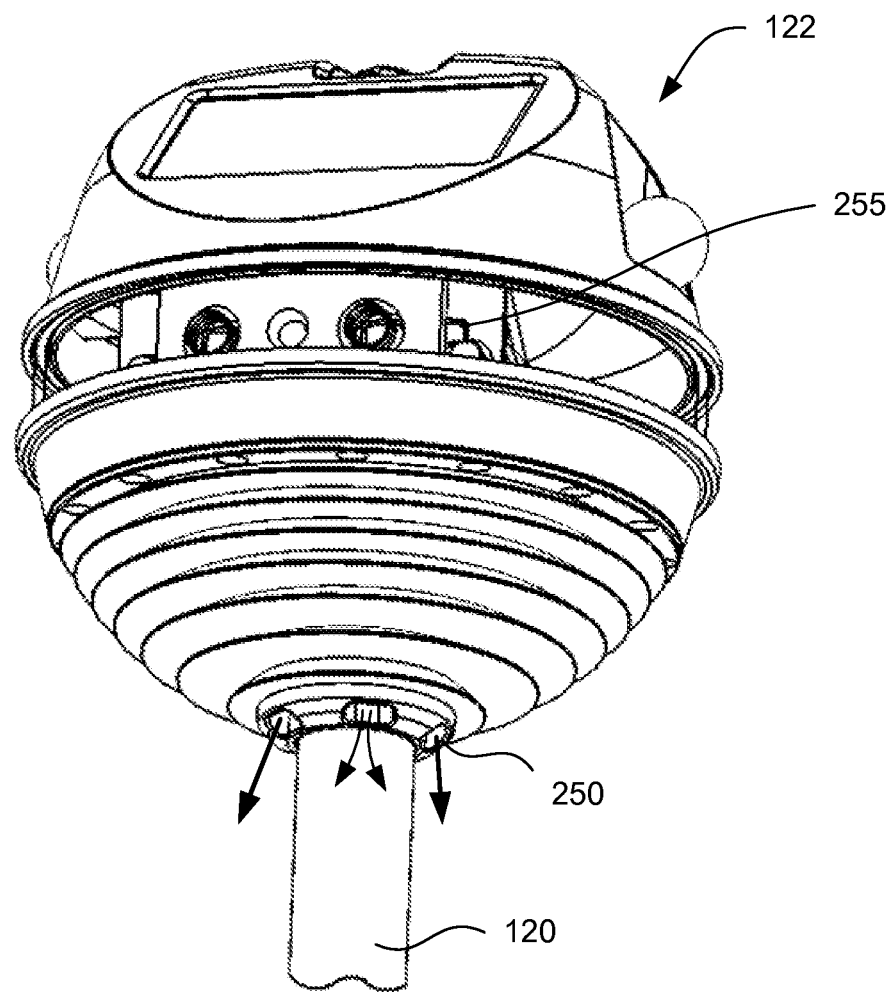
FIG. 16 is an isometric view of the head unit of FIG. 8.

With reference to FIG. 16, the head unit 122 is pressurized by intake fans 246 (see FIG. 15) via main arm 114 and forearm 120. The forearm 120 and main arm 114 are generally hollow so as to effectively define ducting to/from the body. Head unit 122 also includes a plurality of air vents 250 disposed on the underside of the head unit 122. Thus, pressurized air from the intake fans 246 travels through main arm 114, through the forearm 120, into head unit 122, and then exhausts through air vents 250. Accordingly, air flows from the intake fans 246 and through the head unit 122 to cool the components located in the head unit. By pressurizing the head unit 122, the cooling air flow is provided to the head unit 122 without mounting a fan in the head unit 122, which could interfere with the microphones 133.

Figure 17:
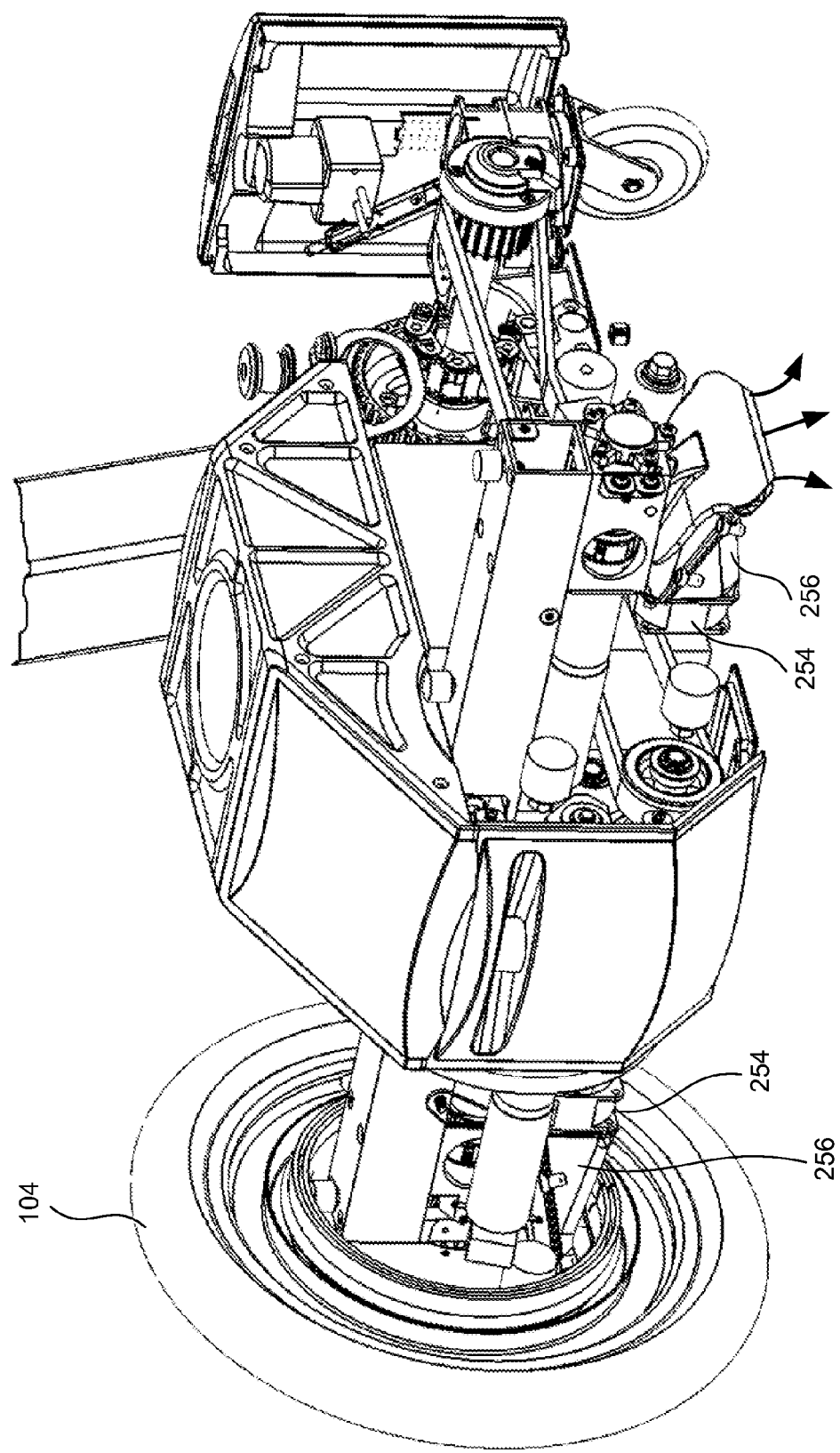
FIG. 17 is a partial isometric view of the robot as viewed from the front with various components hidden to show a drive assembly with exhaust fan ducting.
Figure 18:
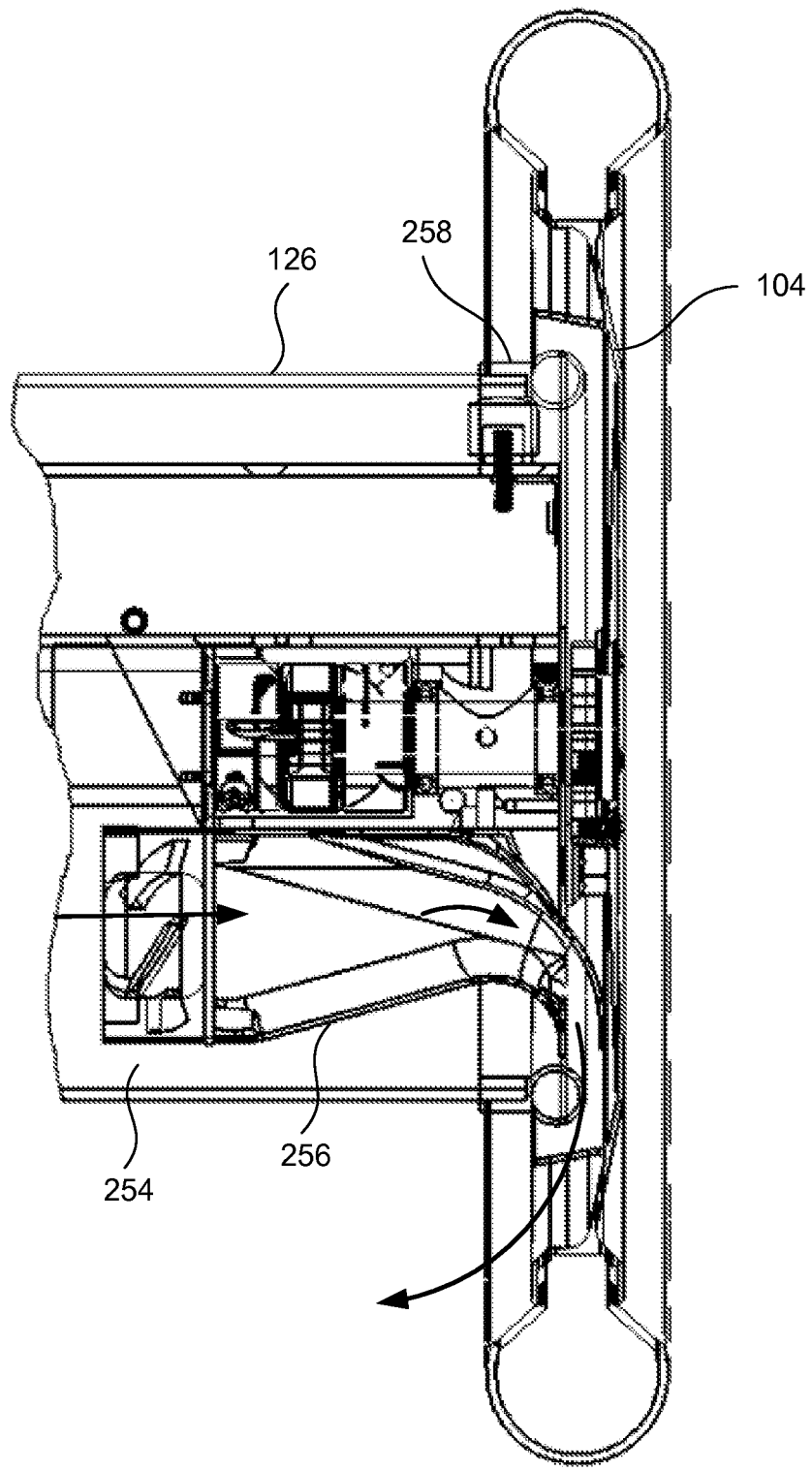
FIG. 18 is a partial cross-section view of the drive assembly illustrating the air flow through the exhaust fan ducting.

As shown in FIG. 17, the air flow cooling system also includes a pair of axle fans 254 disposed in the axle housings 126 (see FIG. 1) and are configured to exhaust air from the axle housings 126. The robot controller 146 (see FIG. 15) is configured to vary the amount of air exhausted from the axle housings 126 by the axle fans 254, thereby regulating the air flow through the head unit 122 and axle housings 126. Similarly, the robot controller 146 can vary the air flow drawn into the body by intake fans 246. Accordingly, the robot controller 146 can vary the amount of air flow at the head unit 122, the axle housings 126, and in the body 102. The air flow cooling system also includes axle ducts 256 positioned between the axle fans 254 and axle vents located adjacent the drive wheel 104. With further reference to FIG. 18, the axle fan 254 draws air from the axle housing 126 and moves it through the axle duct 256 which exhausts the air through an exhaust opening located between the axle housing seal 258 and the drive wheel 104.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A robot, comprising:
   a body;
   a robot controller positioned in the body;
   a pair of axle housings separate from and extending from the body, each containing a drive assembly;
   an arm extending from the body and supporting a head unit;
   at least one intake fan positioned in the body and configured to draw air into the body thereby pressurizing the body, axle housings, and head unit; and
   at least one axle fan positioned in at least one of the pair of axle housings and configured to exhaust the air from the axle housing.

2. The robot of claim 1, wherein the head unit includes one or more air vents.

3. The robot of claim 1, wherein the robot controller is configured to vary an amount of air exhausted from the axle housing by the at least one axle fan, thereby regulating air flow through the head unit and axle housings.

4. The robot of claim 1, further comprising a temperature sensor disposed in the head unit and connected to the robot controller.

5. The robot of claim 4, wherein the robot controller is configured to monitor the temperature sensor and vary an amount of air exhausted from the axle housing by the at least one axle fan, thereby controlling a temperature of the head unit.

6. The robot of claim 1, further comprising an axle duct extending between the at least one axle fan and an axle vent located adjacent a wheel of the drive assembly.

7. The robot of claim 1, further comprising an intake vent positioned on an underside of the body, wherein the intake fan is in fluid communication with the intake vent.

8. A robot, comprising:
   a body;
   a robot controller positioned in the body;
   a pair of axle housings separate from and extending from the body, each containing a drive assembly;
   an arm extending from the body and supporting a head unit in fluid communication with the body;
   at least one intake fan positioned in the body and configured to draw air into the body thereby pressurizing the body, axle housings, and head unit;
   an axle fan positioned in each of the pair of axle housings and configured to exhaust air from the axle housings; and
   a temperature sensor positioned in the head unit and connected to the robot controller, wherein the robot controller is configured to monitor the temperature sensor and vary an amount of air exhausted from the axle housings by the axle fans, thereby controlling a temperature of the head unit.

9. The robot of claim 8, wherein the head unit includes one or more air vents.

10. The robot of claim 8, further comprising a pair of axle ducts, each extending between a corresponding axle fan and a corresponding axle vent located adjacent a wheel of the drive assembly.

11. The robot of claim 8, further comprising an intake vent positioned on an underside of the body, wherein the at least one intake fan is in fluid communication with the intake vent.

12. The robot of claim 8, further comprising a pair of drive assembly temperature sensors connected to the robot controller and positioned to monitor a corresponding drive assembly.

13. The robot of claim 12, wherein the robot controller is configured to monitor the drive assembly temperature sensors and vary an amount of air exhausted from the axle housings by the axle fans, thereby controlling a temperature of the drive assemblies.

14. A method for cooling a robot head unit supported on a body of the robot, the method comprising:
   monitoring a temperature of the head unit;
   drawing a first volume of air into the body of the robot, thereby pressurizing the body and the head unit;
   exhausting a second volume of air from the body through one or more drive assembly housings of the robot; and
   varying the second volume based on the temperature of the head unit.

15. The method of claim 14, further comprising venting air from the head unit.

16. The method of claim 14, wherein the one or more drive assembly housings comprises two drive assembly housings and wherein exhausting the second volume of air from the body comprises operating an axle fan located in each of the two drive assembly housings.

17. The method of claim 16, further comprising monitoring a drive assembly temperature sensor disposed in each of the two drive assembly housings and independently operating the axle fans based on the corresponding drive assembly temperature sensor.

\* \* \* \* \*